July 15, 1952          B. M. HYMAN          2,603,345
HINGED BOOT FLAP PORTABLE ELEVATORS
Filed Nov. 16, 1948          2 SHEETS—SHEET 1
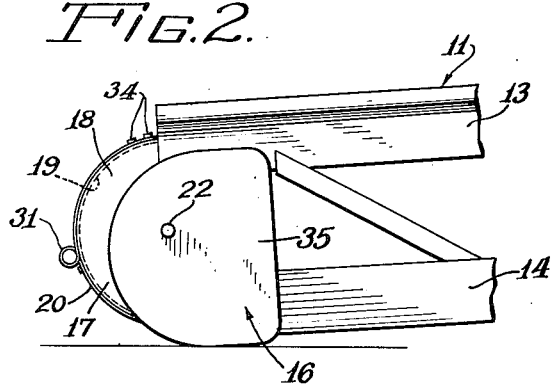
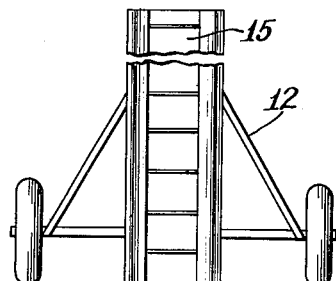
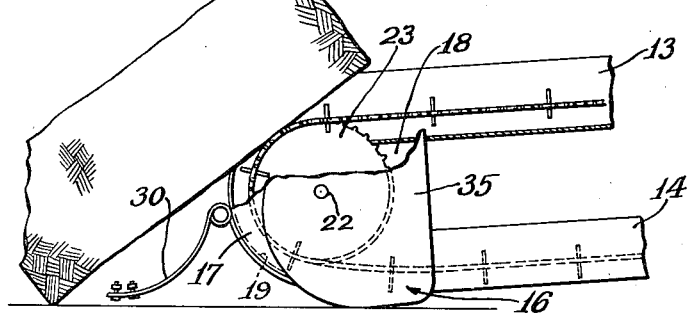
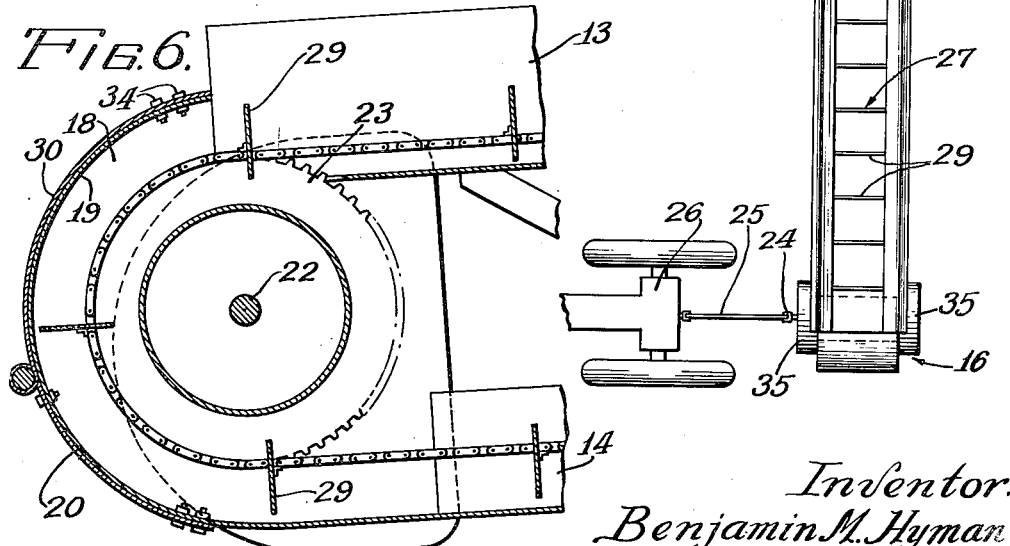
Inventor:
Benjamin M. Hyman July 15, 1952          B. M. HYMAN          2,603,345
HINGED BOOT FLAP PORTABLE ELEVATORS
Filed Nov. 16, 1948          2 SHEETS—SHEET 2
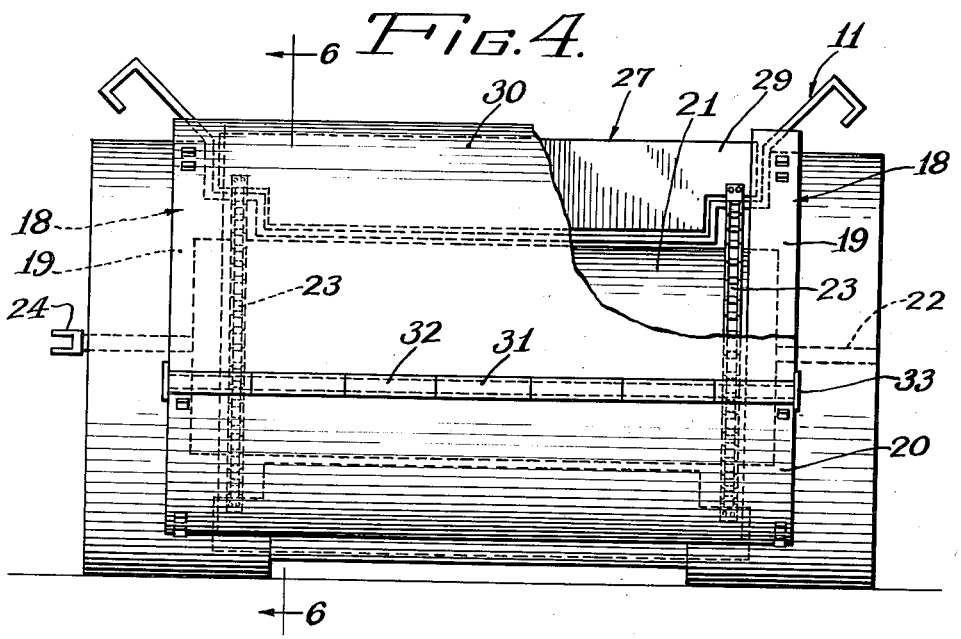
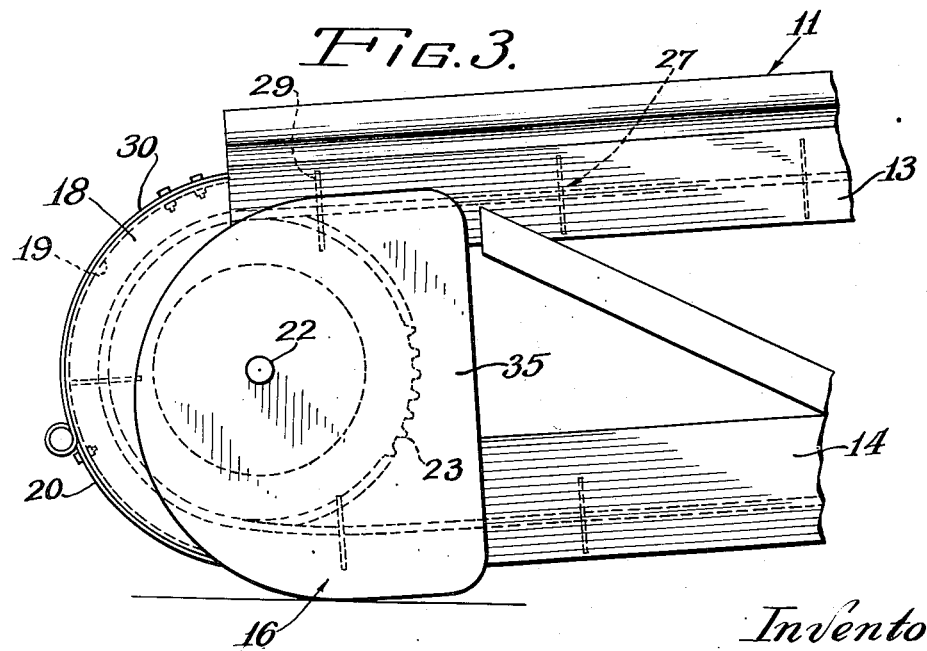
Inventor:
Benjamin M. Hyman
By Paul O. Pippel
Atty.

Patented July 15, 1952

2,603,345

UNITED STATES PATENT OFFICE 2,603,345

HINGED BOOT FLAP PORTABLE ELEVATORS

Benjamin M. Hyman, Moline, Ill., assignor to International Harvester Company, a corporation of New Jersey Application November 16, 1948, Serial No. 60,357

1 Claim. (Cl. 198—172)

This invention relates to a material handling mechanism and more specifically to a portable elevator of a type utilized for conveying grains and other farm products.

Portable elevators of the type which are generally utilized on the farm for handling farm materials usually consist of a wheeled frame on which a conveyor trough is positioned, the trough being movable in a series of inclined positions for conveying materials to a barn or silo. The conveyor trough is provided with an endless conveyor which has a plurality of laterally extending cleats. The endless conveyor is movable so that the cleats travel longitudinally from a lower section of the trough to an upper section whereupon the materials carried on the upper section are moved to the discharge end of the conveyor. A receiving end is generally provided at one end of the trough and the materials to be elevated are dumped into the receiving end. The receiving end is also generally provided with a boot section within which the driving sprockets for the endless conveyor are positioned. The conveyor is trained about the sprockets and as the sprockets are driven from a power source the cleats are moved longitudinally to effect lifting of the materials.

During the normal operation of the conveyor when the chain is utilized for lifting grain or other granular materials, the materials are merely dumped into the receiving end by means of a receiving hopper. In certain instances, however, it is desirable to utilize the portable elevator for conveying bulk materials such as baled hay or other baled farm products. It can readily be appreciated that the bulk materials such as baled hay are quite difficult to handle, and manual lifting of the bales to the conveyor trough is a task which the farmer would rather avoid. It is a prime object of this invention to provide an improved boot section incorporating means whereby baled materials may readily be lifted from the ground onto the conveyor trough of the elevator without the necessity of manually lifting the bales to place them on the receiving portion of the elevator.

It is another object to provide an improved boot section for a portable elevator, said boot section including a housing which includes a portion of the driving mechanism of the conveyor, the boot section also having a hinged boot flap or closure member which is adapted to be readily removed from the boot, thereby exposing cleats and portions of the conveyor immediately adjacent the boot whereby the cleats may readily engage portions of baled material that are supported on the ground and move the bales to the trough of the elevator for subsequent transportation.

These and other objects will become more readily apparent upon a reading of the description when examined in connection with the accompanying drawings.

In the drawings:

Fig. 1 is a plan view of a portable elevator having a tractor connected thereto to supply a source of power.

Fig. 2 is a side elevational view of a boot section of a portable elevator.

Fig. 3 is an enlarged view similar to Fig. 2 showing a boot section and a portion of an endless conveyor.

Fig. 4 is an enlarged end view of a boot section of a portable elevator.

Fig. 5 is a side elevational view of a boot section of a portable elevator, said view showing the open position of a hinged boot flap whereby the conveyor may be utilized for engaging bales of hay.

Fig. 6 is a sectional view through a boot section of a portable elevator, said view being taken substantially along the line 6—6 of Fig. 4.

Referring particularly to Figs. 1, 2 and 3, a portable elevator is generally designated by the reference character 10. The portable elevator 10 includes a longitudinally extending trough 11. The trough 11 is supported on a wheeled frame 12 and is adapted to be raised with respect to the wheel frame 12 by a mechanism (not shown) in a conventional manner. The trough 11 includes an upper section 13 and a lower section 14. A discharge end 15 is provided at one extremity of the trough 11 and a boot section 16 is provided at the other.

The boot section 16 includes a housing 17. The housing 17 comprises a pair of laterally spaced vertical side plates 18 having inwardly extending flange portions 19. The side plates 18 are connected by means of an arcuate or semi-cylindrical end plate 20 having an opening 21 provided for entrance or access into the entrance of the housing 17.

A shaft 22 is supported by the side plates 18 and is rotatable thereon. The shaft 22 has connected thereto driving sprockets 23 which are rotatable by means of a stub shaft 24 adapted to be driven from a universal shaft 25 in turn driven by a tractor or other source of power 26.

An endless conveyor 27 is adapted to longitudinally move in the trough 11 with respect to the upper section 13 and lower section 14. The conveyor 27 includes a pair of laterally spaced chains which are respectively trained about the sprockets 23 and are driven by said sprockets. The conveyor chains are also connected by means of a plurality of laterally extending cleats 29. As best shown in Fig. 6 the cleats 29 are movable longitudinally with respect to the lower section 14 and are movable from this lower section to the upper section 13 for engaging and transporting materials delivered to the upper section. As previously indicated, the end plate 20 is semi-cylindrical and is spaced uniformly from the edges of the cleats, thereby providing sufficient clearance so that the cleats may be moved in a semi-cylindrical path from the lower to the upper section.

A closure member or hinged boot flap 30 is positioned over the opening 21. The boot flap 30 includes hinge portions 31 which are adapted to cooperate with hinge portions 32 on the end plate 20 for hingedly connecting the boot flap about a horizontal axis. A hinge pin 33 extends transversely through the hinges 31 and 32. A boot flap 30 is also shaped to conform to the semi-cylindrical shape of the end plate 20. The boot flap 30 may be secured in the closed position by means of sheet metal screws 34 or other fastening members which extend through the boot flap and through the inwardly extending flanges 19 of the side plates 18.

As shown in Fig. 6, when the boot flap is in its closed position over the opening 21 the flap follows the contour of the end wall or plate and is also spaced from the ends of the cleats in a uniform manner. Laterally spaced sheet metal housings 35 are provided at the sides of the side plates 18 and serve to support the boot section 16.

When the portable elevator is utilized for transporting granular materials, a receiving trough (not shown) may be utilized for delivering the materials to the receiving end of the conveyor trough. In this operation the hinged boot flap is in the closed position shown in Figs. 2, 4 and 6. However, when it is desired to utilize the portable elevator for transporting bulk materials such as baled hay, the sheet metal screws 34 are loosened and the hinged boot flap 30 is rotated into the position shown in Fig. 5. In this position the opening 21 is uncovered and portions of the conveyor and cleats of the same are exposed. Thus a bale of hay which may be situated on the ground may be placed up against the cleats of the conveyor which are immediately adjacent the sprockets and the cleats will engage the bales, thereupon lifting the same onto the conveyor trough, whereupon they are moved upwardly toward the discharge end 15. The hinged boot flap 30, therefore, is effective to expose the cleats of the conveyor as they move in a clockwise direction around the sprockets 23, the cleats thereupon engaging the bales and lifting them without the necessity of having the operator manually lift the bales from the ground onto the conveyor structure. When the lifting of the bales has been completed and the operator again desires to transport granular materials, he simply closes the boot flap and fastens the same by means of the sheet metal screws 34. It can thus be readily appreciated that the transporting of baled material is greatly facilitated and the portable elevator is easily adapted for this purpose. The formerly trying task of lifting the bales onto the conveyor trough is eliminated and an efficient conveying operation is possible. It is, of course, obvious that by exposing portions of the cleats as they move over the sprockets 23 numerous types of material in bulk can readily be lifted onto the conveyor trough.

Thus applicant has provded a novel improvement in a portable elevator and it must be understood that changes and modifications may be made which do not depart from the spirit of the invention as disclosed nor the scope thereof as defined in the appended claim.

What is claimed is:

A material handling mechanism for handling products such as grain, bales and the like including a conveyor trough having upper and lower longitudinally extending sections, a boot section at one end of the conveyor trough, said boot section normally resting on the ground for supporting one end of the trough, the boot section also including a pair of laterally spaced sprockets journalled thereon, an endless conveyor trained about said sprockets, said conveyor including a plurality of cleats movable on said sprockets from the lower section to the upper section for moving materials on said upper section, a housing enclosing said sprockets, said housing including a pair of vertically extending side plates, said end wall having a portion spaced uniformly from the sprockets to provide clearance for said cleats, said arcuate wall being provided with an opening adjacent the upper ends of the sprockets and providing an entrance into said housing, means for closing said opening including an arcuate closure member, the conveyor being operable to handle grains or the like during a closed position of the closure member, means hingedly connecting said closure member to said end wall for movement about a horizontal axis, said closure member normally covering said opening and being movable to an open position to uncover said opening for exposing cleats and portions of the conveyor which are trained about said sprockets, whereby bales partially supported on the ground may be engaged by the exposed cleats for moving said bales into said conveyor trough.

BENJAMIN M. HYMAN.

REFERENCES CITED

The following references are of record in the file of this patent:

UNITED STATES PATENTS

| Number | Name | Date |
|---|---|---|
| 525,635 | Trevithick | Sept. 4, 1894 |
| 675,250 | Shoemaker | May 28, 1901 |
| 1,301,142 | Lefler | Apr. 22, 1919 |
| 1,571,364 | Bates | Feb. 2, 1926 |
| 1,808,421 | Liggett | June 2, 1931 |
| 2,115,816 | Koerner | May 3, 1938 |
| 2,227,557 | Sinden | Jan. 7, 1941 |